United States Patent [19]
Taniguchi et al.

[11] Patent Number: 5,425,015
[45] Date of Patent: Jun. 13, 1995

[54] PHOTOCHROMIC RECORDING WITH A RECORDING AND ERASING TEMPERATURE HIGHER THAN A REPRODUCTION TEMPERATURE

[75] Inventors: Hitoshi Taniguchi; Fumio Matsui, both of Tsurugashima, Japan

[73] Assignee: Pioneer Electronic Corporation, Tokyo, Japan

[21] Appl. No.: 110,687

[22] Filed: Aug. 23, 1993

[30] Foreign Application Priority Data

Aug. 31, 1992 [JP] Japan .................................. 4-231002

[51] Int. Cl.$^6$ ..................... G11B 7/24; C09B 27/00; B41M 5/26
[52] U.S. Cl. .................................. 369/116; 369/288; 428/64; 428/65; 428/913; 430/270; 430/962
[58] Field of Search ............ 369/288, 116, 108, 275.2; 428/64, 65, 913; 430/270, 962

[56] References Cited

U.S. PATENT DOCUMENTS

| | | | |
|---|---|---|---|
| 4,837,063 | 6/1989 | Irie | 369/288 |
| 4,845,240 | 7/1989 | Hibino et al. | 369/288 |
| 5,235,582 | 8/1993 | Taniguchi et al. | 369/108 |
| 5,252,371 | 10/1993 | Taniguchi et al. | 369/288 |
| 5,281,501 | 1/1994 | Tatezono et al. | 430/962 |
| 5,284,691 | 2/1994 | Taniguchi et al. | 369/288 |
| 5,316,899 | 5/1994 | Miyadera et al. | 369/288 |

FOREIGN PATENT DOCUMENTS 64-34973  2/1989  Japan .

*Primary Examiner*—Georgia Y. Epps
*Assistant Examiner*—Kim-Kwok Chu
*Attorney, Agent, or Firm*—Jacobson, Price, Holman & Stern

[57] ABSTRACT

Disclosed is a method of recording, reproducing and erasing information on and from an optical recording medium. A first temperature $T_1$ in the recording and erasing of information is set higher than a second temperature $T_2$ in the information reproduction. Therefore, information once recorded can surely be maintained in repetitive reproduction.

4 Claims, 1 Drawing Sheet

PHOTOCHROMIC RECORDING WITH A RECORDING AND ERASING TEMPERATURE HIGHER THAN A REPRODUCTION TEMPERATURE

BACKGROUND OF THE INVENTION

1. Field of the Invention

The present invention concerns an optical recording medium, and, more particularly, relates to a method of recording, reproducing and erasing information on and from an optical recording medium which uses a photochromic material for a recording film.

2. Description of the Related Art

A photochromic material is used in various fields, such as a light-intensity adjusting filter, a display device, a light intensity-measuring unit, a recording medium in a photoprinting system and dye etc..

Because of the possibility of its use as a reversible memory medium that ensures high-density recording, the photochromic material has recently been receiving attention in the field of optical recording media which use a laser beam.

Recording, reproduction and erasure to an optical recording medium which has a recording film made of such a photochromic material, particularly, bis(thienylethene anhydride)-type recording material, are generally performed in the following procedure. For instance, when recording light of a wavelength of 420 nm is irradiated on the recording film, a coloring reaction occurs on the irradiated portion, forming colored recorded pits there. When erasure light of a wavelength of 550 nm is irradiated on the recorded spots, the color of the colored recorded pits disappear, thus erasing the recorded pits.

If light of a wavelength of 420 nm is used to reproduce (read) information, however, the colored pit portion remain intact but the other uncolored portion therearound is colored. As a result, the whole area around the spot will be colored, disabling the distinction of the actual recorded portion from the unrecorded portion. In other words, the recorded information is erased. If light of a 550-nm wavelength is used to read information, on the contrary, the recorded pits are colored, erasing the information. The biggest bottleneck of an optical recording medium using a photochromic material is that no repetitive information reproduction (reading) is possible.

As a solution to this shortcoming, recently has been proposed a method of using mixed light of light with a 420-nm wavelength (hereinafter referred to simply as "420-nm light") and light with a 550-nm wavelength (hereinafter referred to simply as "550-nm light") to reproduce the recorded information. The principle of this method will now be briefly described below. (1) In reproducing a recorded portion, if mixed light of 420-nm light and 550-nm light is irradiated on the recorded portion, the recording material generates heat when absorbing the 550-nm light so that its color will disappear. This heat accelerates the color reaction by the 420-nm light, keeping the colored status. (2) If the mixed light of 420-nm light and 550-nm light is irradiated on an unrecorded portion, this portion does not absorb the 550-nm light, thus generating no heat. When the unrecorded portion absorbs the 420-nm light, a slight coloring reaction takes place and it will be canceled out by the 550-nm light. The unrecorded portion therefore remains unrecorded.

Even if this conventional method is employed, a slight color reaction occurs at the time of reproducing an unrecorded portion though it would not be recorded as a recorded portion. When reproduction is performed repeatedly, this slight coloring will trigger a change in temperature so that the temperature of the unrecorded portion will rise due to the absorption of the 550-nm light. Eventually, the unrecorded portion will be colored enough so that it is no longer distinguishable from the recorded portion.

SUMMARY OF THE INVENTION

It is therefore an object of the present invention to provide a method of recording, reproducing and erasing information on and from an optical recording medium, which method can surely keep information recorded even through repetitive reproduction and can ensure proper information recording and erasure.

The present invention is directed to provide a method of recording, reproducing and erasing information on and from an optical recording medium having a recording film containing a bis(thienylethene anhydride)-type photochromic material having a ring opening/ring closing portion, which causes a ring opening/ring closing reaction by light stimulation, and a binder, the method comprising the steps of irradiating light with a first wavelength of 300 to 500 nm on the recording film at a time of information recording in such a way that a temperature of the recording film becomes a first temperature $T_1$ to close the ring opening/ring closing portion of the photochromic material, thereby accomplishing recording; irradiating light with a first wavelength of 300 to 500 nm on the recording film at a time of information reproduction in such a way that the temperature of the recording film becomes a second temperature $T_2$, thereby accomplishing reproduction; and irradiating light with a second wavelength of 500 to 700 nm on the recording film at a time of information erasure in such a way that the temperature of the recording film becomes the first temperature $T_1$ to open the ring opening/ring closing portion of the photochromic material, thereby accomplishing erasure, the first temperature $T_1$ in the information recording and erasure being higher than the second temperature $T_2$ in the information reproduction.

As optical recording medium according to the present invention will be described in conduction with the accompanying drawing.

DETAILED DESCRIPTION OF THE PREFERRED EMBODIMENT

Figure 1:
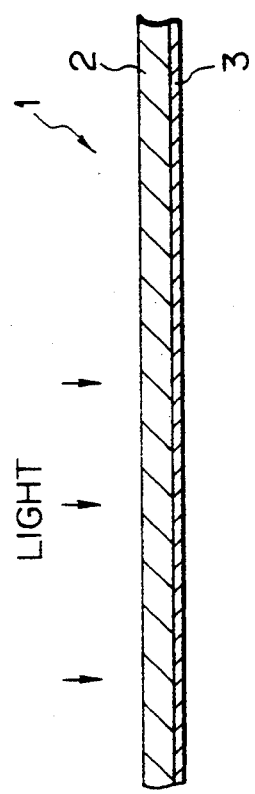
FIG. 1 is an enlarged partial cross section of an optical recording medium.

In FIG. 1, an optical recording medium 1 has a recording film 3 on a substrate 2. Normally, recording light is irradiated on the recording film 3 from the side of the transparent substrate 2 to accomplish recording on the recording film 3.

Various types of known layers may be provided between the substrate 2 and recording film 3.

The recording film 3 contains a bis(thienylethene anhydride)-type photochromic material represented by the following general formula [I].

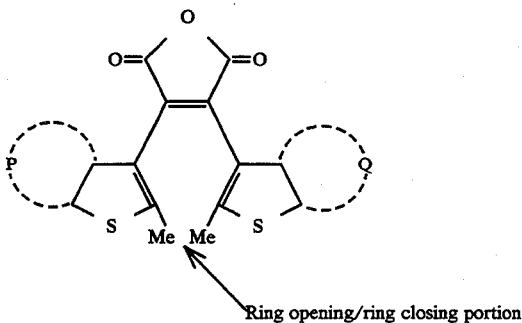

[I]

where P and Q are a substituted or unsubstituted benzene ring or a naphthalene ring provided as necessary and these rings may be of the same type or different types. If P or Q is not formed, substitution of an alkyl group or the like in a thienyl group may be performed. Me represents a methyl group.

The photochromic material is contained in an amount of 1 to 100 parts by weight, preferably 5 to 20 parts by weight relative to 100 parts by weight of a binder to be described later. When the amount of the photochromic material exceeds 100 parts by weight, it is difficult to dissolve this material in the binder. When this amount becomes less than 1 part by weight, it is difficult to distinguish a recorded portion from an unrecorded portion at the reproducing wavelength.

The recording film 3 further contains a binder, which may be polycarbonates, polystyrenes, polyvinyl chlorides, polymethyl methacrylates, amorphous polyolefins, polysulfones, polyallylsulfones, polyether imides, polyarylates, polyether sulfones or the like.

Information recording, reproduction and erasure on and from a recording medium having this recording film 3 are executed as follows.

At the time of information recording, light with a first wavelength of 300 to 500 nm is irradiated on the recording film 3 in such a way that the temperature of the recording film becomes a first temperature $T_1$ to close the ring opening/ring closing portion of the photochromic material, thereby accomplishing recording.

The first temperature $T_1$ is determined appropriately in consideration of the type of the binder to be used or the temperature of thermal deformation of the binder. The first temperature $T_1$ is set lower than the thermal deformation temperature by more than 0° to 80° C. This is because that above the thermal deformation temperature, a change in the shape of the binder starts taking place and the binder does not return to the initial shape even erasure is performed, and when the first temperature $T_1$ becomes lower than the thermal deformation temperature by 80° C. at the maximum, there would not be any temperature dependency of the recording (coloring) reaction. For instance, if polycarbonates are used as the binder, the first temperature $T_1$ is set to 100° to 140° C., preferably 130° to 140° C.

At the time of reproduction, light with the first wavelength of 300 to 500 nm is irradiated on the recording film 3 in such a way that the temperature of the recording film becomes a second temperature $T_2$, thereby accomplishing reproduction.

In this case, the second temperature $T_2$, is set lower than the first temperature $T_1$ used in the information recording. The reason of such temperature settings is as follows: while an unrecorded portion is colored to some degree when reproduced, the portion which has information recorded at the first temperature $T_1$ always keeps greater coloring, thus making it possible to distinguish the recorded portion from the unrecorded portion. The second temperature $T_2$, like the first temperature $T_1$, is determined properly in accordance with the type of the binder employed. If polycarbonates are used as the binder, for example, the second temperature $T_2$ is set to 20° to 60° C., preferably 20° to 30° C.

At the time of erasure, light with a second wavelength of 500 to 700 nm is irradiated on the recording film in such a way that the temperature of the recording film becomes the first temperature $T_1$ to open the ring opening/ring closing portion of the photochromic material, thereby accomplishing erasure. The reason why the first temperature $T_1$ in the information erasure is set equal to the second temperature $T_2$ in the information reproduction to set the recording film fully back to the initial state (before recording) with the same thermal hysteresis.

A more detailed description of the present invention will now be given with reference to specific experimental examples.

First, 10 parts by weight of bis(thienylethene anhydride) whose P and Q in the general formula [I] is specified by a benzene ring was mixed with 100 parts by weight of polycarbonate as a binder, and this mixture was coated on a glass substrate, forming a recording film about 10 μm thick thereon.

The following experiments were conducted using the thus produced samples in an initialized state (unrecorded samples). In the experiments, recording light used was light having a wavelength of 420 nm which ensures such a steady light condition that the temperature of the recording film becomes the first temperature $T_1 = 140°$ C., reproducing light used was light having a wavelength of 420 nm which ensures such a steady light condition that the temperature of the recording film becomes the second temperature $T_2 = 20°$ C., erasing light used was light having a wavelength of 550 nm which ensures such a steady light condition that the temperature of the recording film becomes the first temperature $T_1 = 140°$ C.

Experiment 1

Light with a wavelength of 420 nm and output power of 0.1 mi was irradiated on an initialized sample for 50 seconds to color the recording film in such a steady light condition that the temperature of the recording film became the second temperature $T_2 = 20°$ C. When the light absorbance at a wavelength of 550 nm was measured at this time, it was 0.153.

Experiment 2

Light with a wavelength of 420 nm and output power of 10 mi was irradiated on an initialized sample for 50 seconds to color the recording film in such a steady light condition that the temperature of the recording film became the first temperature $T_1 = 140°$ C. When the light absorbance at a wavelength of 550 nm was measured at this time, it was 0.419. It is apparent from the results of the Experiments 1 and 2 that the higher the temperature is, the greater the degree of coloring becomes.

Experiment 3

The temperature of the sample colored in the abovementioned Experiment 2 was returned to 20° C. in a dark place, and while maintaining this temperature, the same light irradiation as done in the above Experiment 1 was conducted, i.e., light with a wavelength of 420 nm and output power of 0.1 mi was irradiated on the recording film until a steady light condition was reached. When the light absorbance at a wavelength of 550 nm was measured, it merely dropped to 0.189. As a comparison, the opposite approach was taken; the temperature of the sample colored in Experiment 2 was returned to 20° C. in a dark place, light with a 550-nm wavelength was temporarily irradiated on the sample to cause the coloring to disappear completely, and then light with a wavelength of 420 nm and output power of 0.1 mi was irradiated on the sample for 50 seconds so that the temperature of the recording film became the second temperature $T_2=20°$ C. in a steady light condition, as in Experiment 1, thus coloring the recording film. When the light absorbance at a wavelength of 550 nm was measured, it was also 0.189. It is apparent from those results that the light absorbance of the recorded portion once recorded at a high temperature $T_l$ of 140° C. drops as low as 0.189 due to no thermal hysteresis even when reproducing light with a low temperature $T_2$ of 20° C. is irradiated.

Experiment 4

Light with a wavelength of 550 nm and output power or 20 mi was irradiated on the sample colored in the second step in Experiment 2 for 50 seconds to completely cancel the coloring of the recording film in such a steady light condition that the temperature of the recording film became the first temperature $T_1=140°$ C. Then, the temperature of the resultant sample was returned to 20° C. in a dark place, and light with a 420-nm wavelength and output power of 0.1 mi was irradiated on the sample to color the recording film, as in Experiment 1. When the light absorbance at a wavelength of 550 nm was measured, it was 0.153. It is apparent from the results that the recorded portion once recorded at a high temperature $T_1$ of 140° C. returns to the original state because of erasure conducted with thermal hysteresis at the same high temperature of $T_1=140°$ C., and that when light having a wavelength of 420 nm is irradiated at a low temperature of $T_2=20°$ C. thereafter, the light absorbance becomes 0.153. In other words, the results are the same as those of Experiment 1.

Discussion on the Results of the Above Experiments

In recording information, light with a wavelength of 420 nm is irradiated while keeping the first temperature $T_1$ of 140° C. (steady light condition). Then, it is apparent from the results of Experiment 2 that the light absorbance of the colored, recorded portion (wavelength of 550 nm) becomes 0.419 while the light absorbance of the unrecorded portion (wavelength of 550 nm) becomes 0.

In reproducing information, light with a wavelength of 420 nm is irradiated while keeping the temperature $T_2=20°$ C., lower than the first temperature $T_1$ of 140°, (steady light condition). Then, it is apparent from the results of Experiment 3 that the maximum change in the light absorbance of the colored, recorded portion is ranging from 0.419 to 0.189. With regard to the unrecorded portion, although the unrecorded portion is colored, the degree of the coloring is merely ranging from 0 to 0.153 at the maximum, as apparent from the results of Experiments 1 through 4. That is, once recording is done at a high temperature of $T_1=140°$ C., when reproduction is conducted later at a wavelength $T_2=20°$ C. lower than the former temperature, the maximum changes in light absorbance of both the recorded portion and unrecorded portion, even if actually occurred, are 0.189 and 0.153, respectively. There is a clear difference between those light absorbencies, thus permitting reading (reproduction) of the recorded information.

What is claimed is:

1. A method of recording, reproducing and erasing information on and from an optical recording medium having a recording film containing a bis(thienylethene anhydride)-type photochromic material represented by the general formula (I) given below and having a ring opening/ring closing portion, which causes a ring opening/ring closing reaction by light stimulation, and a binder, said method comprising the steps of:

irradiating light with a first wavelength of 300 to 500 nm on said recording film at a time of information recording so that a temperature of said recording film at an irradiated portion is raised to a temperature $T_1$ to close said ring opening/ring closing portion of said photochromic material, thereby accomplishing recording:

irradiating light with a first wavelength of 300 to 500 nm on said recording film at a time of information reproduction so that said temperature of said recording film at an irradiated portion is raised to a second temperature $T_2$ thereby accomplishing reproduction; and irradiating light with a second wavelength of 500 to 700 nm on said recording film at a time of information erasure so that said temperature of said recording film at an irradiated portion is raised to said temperature $T_1$ to open said ring opening/ring closing portion of said photochromic material, thereby accomplishing erasure, said first temperature $T_1$ in said information recording and erasure being higher than said second temperature $T_2$ in said information reproduction:

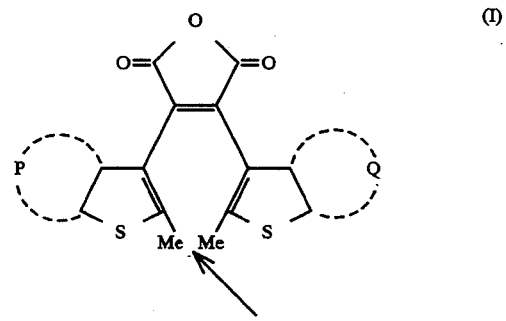

(I)

ring opening/ring closing portion where P and Q are a substituted or unsubstituted benzene ring or a naphthalene ring provided as necessary and these rings may be of the same type or different types, and Me is a methyl group.

2. The method according to claim 1, wherein said first temperature $T_1$ is determined by a thermal deformation temperature of said binder and is set to be lower than said thermal deformation temperature by more than 0° to 80° C.

3. The method according to claim 1 or 2, wherein with said binder being polycarbonates, said first temperature $T_1$ is 100° to 140° C. while said second temperature $T_2$ is 20° to 60° C.

4. The method according to claim 2, wherein with said binder being polycarbonates, said first temperature $T_1$ is 100° to 140° C. while said second temperature $T_2$ is 20° to 60° C.

* * * * *